United States Patent
Ullah et al.

(10) Patent No.: US 8,641,366 B1
(45) Date of Patent: Feb. 4, 2014

(54) NON-CONTACTING SEALS FOR GEARED GAS TURBINE ENGINE BEARING COMPARTMENTS

(71) Applicant: United Technologies Corporation, Hartford, CT (US)

(72) Inventors: M. Rifat Ullah, South Windsor, CT (US); Robert E. Peters, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/787,919

(22) Filed: Mar. 7, 2013

(51) Int. Cl.
*F01D 11/00* (2006.01)
*F16J 15/34* (2006.01)

(52) U.S. Cl.
USPC .............................. 415/111; 415/230; 277/400

(58) Field of Classification Search
USPC .......... 415/229, 230, 231, 110, 111; 277/400, 277/401, 408
See application file for complete search history.

(56) References Cited

U.S. PATENT DOCUMENTS

| | | | |
|---|---|---|---|
| 4,613,141 A * | 9/1986 | Heinen | ..................... 277/359 |
| 6,145,843 A | 11/2000 | Hwang | |
| 8,162,322 B2 | 4/2012 | Flaherty | |
| 2008/0310953 A1* | 12/2008 | Garrison | ..................... 415/173.2 |

\* cited by examiner

*Primary Examiner* — Dwayne J White
(74) *Attorney, Agent, or Firm* — Carlson, Gaskey & Olds, PC

(57) ABSTRACT

A rotating element is associated with at least one bearing compartment that includes a bearing to support the rotating element. A seal resists leakage of lubricant outwardly of the bearing compartment and allows air to flow from a chamber across the seal and into the bearing compartment. The seal has a seal face facing a rotating face rotating with the rotating element. The seal is a non-contact seal. A gas turbine engine is also disclosed.

26 Claims, 3 Drawing Sheets

NON-CONTACTING SEALS FOR GEARED GAS TURBINE ENGINE BEARING COMPARTMENTS

BACKGROUND

Gas turbine engines are known and, when utilized in aircraft applications, typically include a fan delivering air into a bypass duct and into a core engine flow. The core engine flow passes into a compressor where the air is compressed and then delivered into a combustion section. The air is mixed with fuel in the combustion section and ignited. Products of that combustion pass downstream over turbine rotors, driving them to rotate.

Historically, a fan drive turbine drove the fan through a direct drive, such that they rotated at the same speed. This restricted the speed available for the fan drive turbine, as the fan speed was limited.

More recently, it has been proposed to include a gear reduction between the fan drive turbine and the fan. With this change, the speed of the fan drive turbine can increase.

In gas turbine engines, there are a number of bearing compartments which are desirably sealed. In the prior art, operating at slower speeds, contact seals have been utilized, which directly contacted surfaces rotating with the shaft to seal the bearing compartments. Such contact seals were typically cooled using oil or other lubricant, which was circulated through a cooling system. For geared engines, in which certain components are enabled to rotate faster than corresponding components in non-geared engines, to achieve the same amount of cooling a larger volume of lubricant would be needed. Moreover, a larger volume of lubricant would require a larger holding tank and correspondingly larger cooling system fluid pumping apparatus. All of the larger volume of lubricant, the larger holding tank, and the larger fluid pumping apparatus would add undesirable weight to the engine.

SUMMARY

In a featured embodiment, a section for a gas turbine engine has a rotating element and at least one bearing compartment including a bearing for supporting the rotating element. A seal resists leakage of lubricant outwardly of the bearing compartment and allows air to flow from a chamber, across the seal and into the bearing compartment. The seal has a seal face facing a rotating face rotating with the rotating element. The seal is a non-contact seal.

In another embodiment according to the previous embodiment, a seal is associated with each of two opposed axial ends, on either axial side of the bearing.

In another embodiment according to any of the previous embodiments, the rotating element is a shaft rotating with a rotor having an axial face facing the seal face.

In another embodiment according to any of the previous embodiments, a grooved area is formed in one of the faces, with the grooved area having a plurality of circumferentially spaced grooves for generating hydrodynamic lift-off forces and allowing leakage of pressurized air across the seal face and into the bearing compartment to resist leakage of lubricant from the bearing compartment.

In another embodiment according to any of the previous embodiments, the grooved area is formed in the rotor.

In another embodiment according to any of the previous embodiments, the seal is formed with a plurality of passages to allow tapping of additional pressurized air to be delivered to the sealing faces at a location in the proximity of the grooved area for generating hydrostatic lift-off forces.

In another embodiment according to any of the previous embodiments, the seal face faces radially inwardly.

In another embodiment according to any of the previous embodiments, the seal is a circumferentially segmented carbon seal.

In another embodiment according to any of the previous embodiments, the rotating element is a shaft rotating with a rotor having a circumferential face facing the seal face.

In another embodiment according to any of the previous embodiments, a grooved area is formed in one of the faces. The grooved area has a plurality of circumferentially spaced grooves generating hydrodynamic lift-off forces and allowing leakage of pressurized air across the seal face and into the bearing compartment to resist leakage of lubricant from the bearing compartment.

In another embodiment according to any of the previous embodiments, the seal is a controlled gap carbon seal having a full hoop seal and a metal band shrunk fit onto the seal, and positioned in a seal carrier.

In another embodiment according to any of the previous embodiments, the rotating element is driven by a fan drive turbine.

In another embodiment according to any of the previous embodiments, the seal is a carbon seal.

In another featured embodiment, a gas turbine engine has a fan, a compressor section, a combustor, and a turbine section with a fan drive turbine driving the fan through a gear reduction. A rotating element and at least one bearing compartment includes a bearing for supporting the rotating element. A seal resists leakage of lubricant outwardly of the bearing compartment and allows air to flow from a chamber across the seal into the bearing compartment. The seal has a seal face facing a rotating face rotating with the rotating element. The seal is a non-contact seal.

In another embodiment according to the previous embodiment, the bearing compartment has a seal associated with each of two opposed axial ends, on either axial side of the bearing.

In another embodiment according to any of the previous embodiments, the rotating element is a shaft rotating with a rotor having an axial face facing the seal face.

In another embodiment according to any of the previous embodiments, a grooved area is formed in one of the faces, with the grooved area having a plurality of circumferentially spaced grooves generating hydrodynamic lift-off forces and allowing leakage of pressurized air across the faces and into the bearing compartment. The grooved area resists leakage of lubricant from the bearing compartment.

In another embodiment according to any of the previous embodiments, the grooved area is formed in the rotor.

In another embodiment according to any of the previous embodiments, the seal is formed with a plurality of passages to allow tapping of additional pressurized air to be delivered to the faces at a location in the proximity of the grooved area for generating hydrostatic lift-off forces.

In another embodiment according to any of the previous embodiments, the seal face faces radially inwardly.

In another embodiment according to any of the previous embodiments, the seal is a circumferentially segmented carbon seal.

In another embodiment according to any of the previous embodiments, the rotating element is a shaft rotating with a rotor having a circumferential face facing the seal face.

In another embodiment according to any of the previous embodiments, a grooved area is formed in one of the faces. The grooved area has a plurality of circumferentially spaced grooves for generating hydrodynamic lift-off forces and allowing leakage of pressurized air across the seal face and into the bearing compartment to resist leakage of lubricant from the bearing compartment.

In another embodiment according to any of the previous embodiments, the seal is a controlled gap carbon seal having a full hoop seal and a metal band shrunk fit onto the seal, and positioned in a seal carrier.

In another embodiment according to any of the previous embodiments, the rotating element is driven by a fan drive turbine.

In another embodiment according to any of the previous embodiments, the seal is a carbon seal.

These and other features may be best understood from the following drawings and specification.

DETAILED DESCRIPTION

Figure 1:
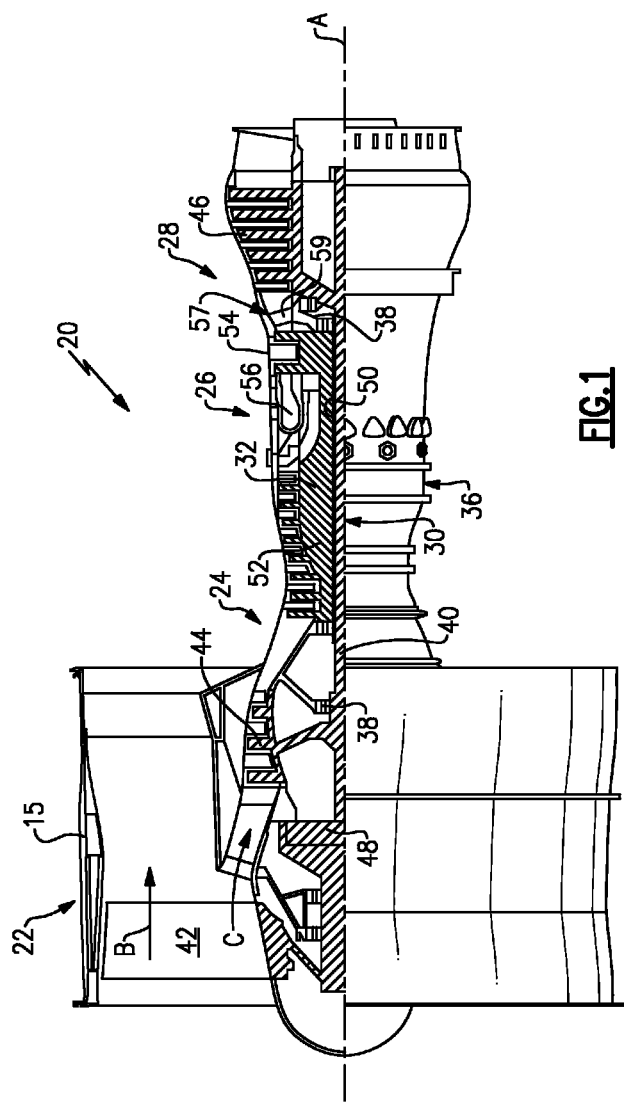
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicyclic gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

Figure 2:
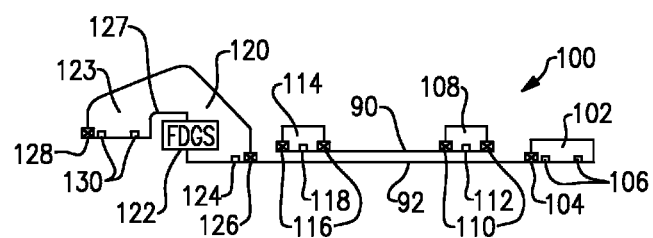
FIG. 2 schematically shows example locations of bearing compartments.

FIG. 2 shows an embodiment of an arrangement of bearing compartments 100 associated with the gas turbine engine, such as the gas turbine engine 20 illustrated in FIG. 1. As shown, a bearing compartment 102 is associated with a low speed shaft 92 at a location associated with the low pressure turbine. Bearings 106 are shown schematically as is a seal 104.

A bearing compartment 108 is associated with a high speed rotor 90 and at the high pressure turbine of FIG. 1. Bearing compartment 108 includes seals 110 at each axial end and a central bearing 112.

Another bearing compartment 114 is also associated with the high speed rotor 90 and the high pressure compressor and includes a bearing 118 and seals 116.

Finally, a bearing compartment is associated with a fan drive gear system 122 at location 120 and with and the fan at location 123. Seals 126 and 128 mechanically seal the axial ends of the bearing compartment 120 and are associated with the fan rotor 127 and the low speed rotor 92. The seals 126, 128 are also respectively associated with the bearings 124 and 130 that are positioned within the bearing compartment 120/123.

There are challenges with sealing the bearing compartments in a geared turbofan engine. Accordingly, various embodiments disclosed herein relate to the use of non-contacting seals such as lift-off seals at any one or more of the locations of the seals shown in FIG. 2 or in any other bearing compartment on a gas turbine engine. In some embodiments, the seals may be lift-off seals and, more particularly, may be carbon lift-off seals. Of course, in other embodiments other non-contacting seals, including other lift-off seals may be used.

Figure 3A:
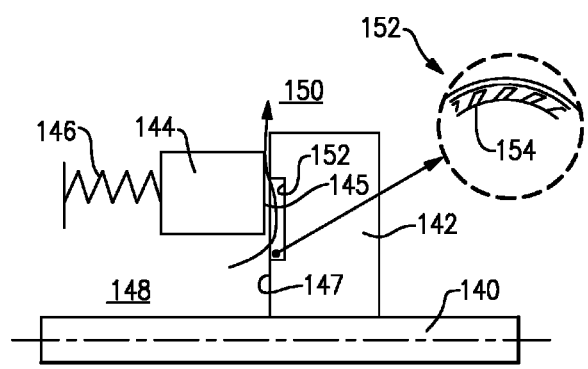
FIG. 3A is a first embodiment of a non-contact seal according to the present invention.

Thus, as shown in FIG. 3A, a shaft 140, which could be any rotating shaft in a gas turbine engine, has a mating rotor 142. An axial face 147 of this mating rotor 142 is sealed relative to a face 145 from a seal 144. The faces 145 and 147 face each other to form a mechanical seal. The seal 144 may be a non-contact seal such as a carbon seal lift-off seal. The interface between faces 145 and 147 experiences high velocities, especially when compared to the prior art. The high velocity is a combination of a high rotational speed of the shaft 140 and a relatively large diameter for the seal 144. Velocities greater than or equal to about 450 ft/second (137.16 meters/second) may be seen.

In the FIG. 3A embodiment seal 144, a set of shallow grooves 152 is provided by cutting into the face 147 of the rotor 142, as shown at circumferentially spaced grooves 154. A spring 146 biases the seal 144 toward the face 147. A higher pressure air is available in a chamber 148, which is on an opposed side of the seal 144 from the bearing compartment 150. The bearing compartment 150 is at a lower pressure than the chamber 148, and this higher pressure air passes through the grooved area 152, such that the air flow levitates (lifts-off) the sealing surface 145 of the non-rotating seal 144 from the sealing surface 147 of the rotor 142. The levitation is a result of hydrodynamic lifting force as the air passes into the bearing compartment 150, preventing oil from escaping the bearing compartment 150.

Figure 3B:
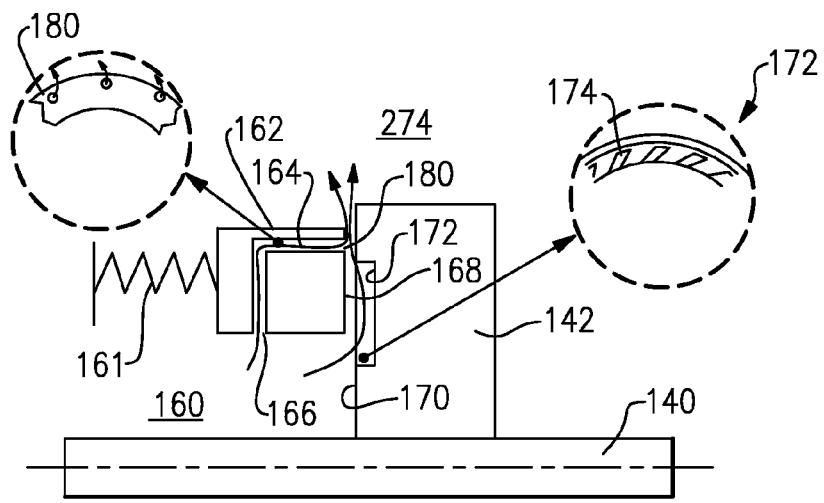
FIG. 3B shows a second embodiment of a non-contact seal according to the present invention.

Another embodiment is illustrated in FIG. 3B. FIG. 3B provides the mechanical sealing between face 168 of a non-rotating seal 162 and a face 170 of a rotor in a manner somewhat similar to the FIG. 3A embodiment. There is a grooved area 172 having circumferentially spaced grooves 174 with the features as described for the first embodiment that generate hydrodynamic lifting force as the gas passes from a high pressure chamber 160 into the bearing compartment 274. Furthermore, the non-rotating seal 162 has an inlet 166, a passage 164, and an outlet 180 which delivers additional high pressure air generating hydrostatic lifting forces at a radial location in the proximity of the grooved area 172, thereby providing a stronger and more stable lift-off seal compared to the first embodiment. As shown, there is a plurality of circumferentially spaced outlets 180. The non-rotating seal 162, which is biased toward the rotor 170 by a spring 161, may be a carbon lift-off seal.

Figure 3C:
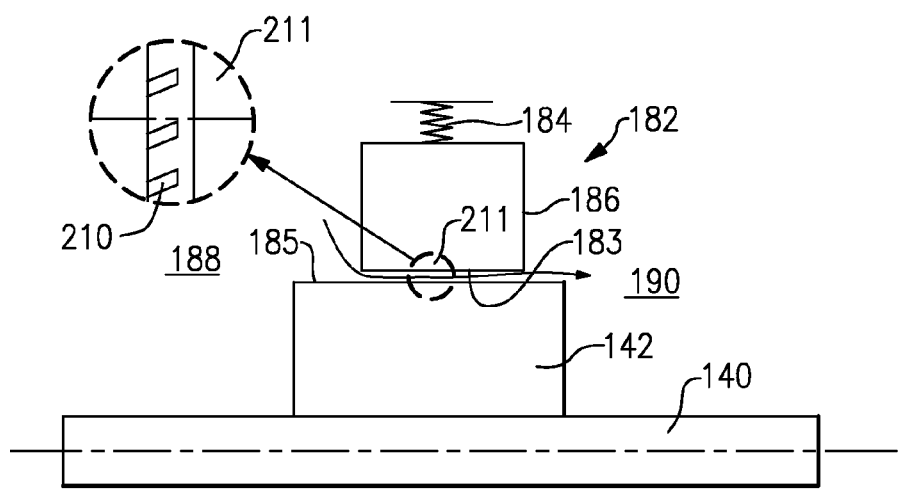
FIG. 3C shows a third embodiment of a non-contact seal according to the present invention.

FIG. 3C shows another embodiment 182, wherein the seal 186 has a plurality of circumferentially segmented members biased by spring 184 toward a face 185 of a rotor 142 rotating with the shaft 140. Seal 186 has a radially inwardly facing face 183 providing the seal face with the mating face 185. One of the sealing faces, either 183 or 185, has a set of shallow, circumferentially spaced grooves 210 in a grooved area 211, somewhat similar to those described in the earlier embodiments that generate a hydrodynamic force that levitates (lifts-off) the non-rotating sealing surface 183 from the rotating mating surface 185 when the high pressure chamber 188 delivers pressurized air across the seal 186 to prevent leakage of oil from the bearing compartment 190.

Figure 3D:
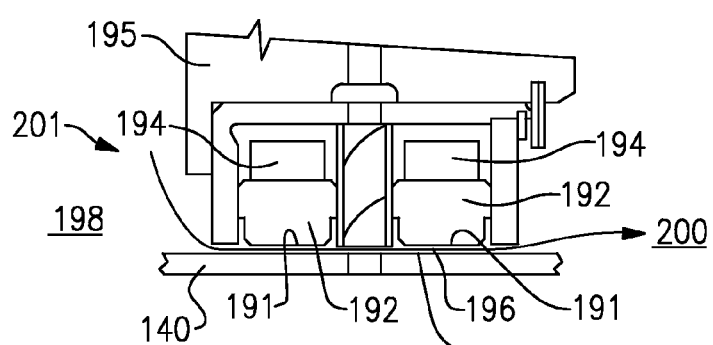
FIG. 3D shows a fourth embodiment of a non-contact seal assembly according to the present invention.

FIG. 3D shows an embodiment of a controlled gap non-contacting seal assembly 201. The shaft 140 has an outer surface spaced by a small gap 196 from two carbon seals 192. The gap is controlled by design, typically by sizing the sealing diameters of the seals 192 and the rotor 140 such that a small gap is maintained under all conditions. The shaft outer surface 193 and a radially inward facing surfaces 191 of the seals 192 provide the seal faces. In one embodiment, the carbon seals 192 are full hoop members extending around the entire circumference of the shaft 140. A metal band 194 is shrunk fit onto the seal 192. A carrier 195 mounts the seals 192. A high pressure chamber 198 is spaced from the bearing compartment 200, such that high pressure air passes through the gap 196 to prevent the leakage of lubricant.

All of the disclosed embodiments reduce the friction between the seal and the rotating components. This reduces heat generation due to friction, increases the durability of the seals, minimizes loss of oil, and increases the efficiency in fuel consumption of the overall engine. Moreover, as a result of the reduction in friction, less lubricant can be used, thereby also reducing the size of the applicable fluid storage tank (not shown) and the applicable cooling system fluid pumping apparatus (also not shown). Accordingly, the overall weight of the engine may be greatly reduced, thereby increasing the engine's fuel efficiency.

The disclosed embodiments may be useful at any bearing compartment in a gas turbine engine. Although shafts are shown supported by the bearings, the disclosure would extend to other rotating elements supported by a bearing.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. A section for a gas turbine engine comprising:
   a rotating element and at least one bearing compartment including a bearing for supporting said rotating element, a seal for resisting leakage of lubricant outwardly of said bearing compartment and for allowing air to flow from a chamber across the seal and into the bearing compartment;
   said seal having a seal face facing a rotating face rotating with said rotating element, and said seal being a non-contact seal;
   said rotating element is a shaft rotating with a rotor having an axial face facing said seal face;
   a grooved area is formed in one of said faces, with said grooved area having a plurality of circumferentially spaced grooves for generating hydrodynamic lift-off forces and allowing leakage of pressurized air across said seal face and into the bearing compartment to resist leakage of lubricant from the bearing compartment; and said grooved area is formed in said rotor.

2. A section for a gas turbine engine comprising:
a rotating element and at least one bearing compartment including a bearing for supporting said rotating element, a seal for resisting leakage of lubricant outwardly of said bearing compartment and for allowing air to flow from a chamber across the seal and into the bearing compartment;
said seal having a seal face facing a rotating face rotating with said rotating element, and said seal being a non-contact seal; and
said bearing compartment has a seal associated with each of two opposed axial ends, on either axial side of said bearing.

3. The section as set forth in claim 2, wherein said rotating element is a shaft rotating with a rotor having an axial face facing said seal face.

4. The section as set forth in claim 3, wherein a grooved area is formed in one of said faces, with said grooved area having a plurality of circumferentially spaced grooves for generating hydrodynamic lift-off forces and allowing leakage of pressurized air across said seal face and into the bearing compartment to resist leakage of lubricant from the bearing compartment.

5. The section as set forth in claim 4, wherein said grooved area is formed in said rotor.

6. The section as set forth in claim 4, wherein said seal being formed with a plurality of passages to allow tapping of additional pressurized air to be delivered to the faces at a location in the proximity of the grooved area for generating hydrostatic lift-off forces.

7. A section for a gas turbine engine comprising:
a rotating element and at least one bearing compartment including a bearing for supporting said rotating element, a seal for resisting leakage of lubricant outwardly of said bearing compartment and for allowing air to flow from a chamber across the seal and into the bearing compartment;
said seal having a seal face facing a rotating face rotating with said rotating element, and said seal being a non-contact seal; and
said seal face faces radially inwardly.

8. The section as set forth in claim 7, wherein said seal is a circumferentially segmented carbon seal.

9. The section as set forth in claim 8, wherein said rotating element is a shaft rotating with a rotor having a circumferential face facing said seal face.

10. The section as set forth in claim 9, wherein a grooved area is formed in one of said faces, with said grooved area having a plurality of circumferentially spaced grooves for generating hydrodynamic lift-off forces and allowing leakage of pressurized air across said seal face and into the bearing compartment to resist leakage of lubricant from the bearing compartment.

11. The section as set forth in claim 7, wherein said seal is a controlled gap carbon seal having a full hoop seal and a metal band shrunk fit onto the seal, and positioned in a seal carrier.

12. The section as set forth in claim 1, wherein the rotating element is driven by a fan drive turbine.

13. The section as set forth in claim 1, wherein said seal is a carbon seal.

14. A gas turbine engine comprising:
a fan, a compressor section, a combustor, and a turbine section with a fan drive turbine driving said fan through a gear reduction;
a rotating element and at least one bearing compartment including a bearing for supporting said rotating element, a seal for resisting leakage of lubricant outwardly of said bearing compartment and for allowing pressurized air to flow from a chamber across said seal into the bearing compartment;
said seal having a seal face facing a rotating face rotating with said rotating element, and said seal being a non-contact seal;
said rotating element is a shaft rotating with a rotor having an axial face facing said seal face;
a grooved area is formed in one of said faces, with said grooved area having a plurality of circumferentially spaced grooves for generating hydrodynamic lift-off forces and allowing leakage of pressurized air across said faces and into the bearing compartment to resist leakage of lubricant from the bearing compartment; and
said grooved area is formed in said rotor.

15. A gas turbine engine comprising:
a fan, a compressor section, a combustor, and a turbine section with a fan drive turbine driving said fan through a gear reduction;
a rotating element and at least one bearing compartment including a bearing for supporting said rotating element, a seal for resisting leakage of lubricant outwardly of said bearing compartment and for allowing pressurized air to flow from a chamber across said seal into the bearing compartment;
said seal having a seal face facing a rotating face rotating with said rotating element, and said seal being a non-contact seal; and
said bearing compartment has a seal associated with each of two opposed axial ends, on either axial side of said bearing.

16. The gas turbine engine as set forth in claim 15, wherein said rotating element is a shaft rotating with a rotor having an axial face facing said seal face.

17. The gas turbine engine as set forth in claim 16, wherein a grooved area is formed in one of said faces, with said grooved area having a plurality of circumferentially spaced grooves for generating hydrodynamic lift-off forces and allowing leakage of pressurized air across said faces and into the bearing compartment to resist leakage of lubricant from the bearing compartment.

18. The gas turbine engine as set forth in claim 17, wherein said grooved area is formed in said rotor.

19. The gas turbine engine as set forth in claim 17, wherein said seal being formed with a plurality of passages to allow tapping of additional pressurized air to be delivered to the faces at a location in the proximity of the grooved area for generating hydrostatic lift-off forces.

20. A gas turbine engine comprising:
a fan, a compressor section, a combustor and a turbine section with a fan drive turbine driving said fan through a gear reduction;
a rotating element and at least one bearing compartment including a bearing for supporting said rotating element, a seal for resisting leakage of lubricant outwardly of said bearing compartment and for allowing pressurized air to flow from a chamber across said seal into the bearing compartment;

said seal having a seal face facing a rotating face rotating with said rotating element, and said seal being a non-contact seal; and said seal face faces radially inwardly.

21. The gas turbine engine as set forth in claim 20, wherein said seal is a circumferentially segmented carbon seal.

22. The gas turbine engine as set forth in claim 21, wherein said rotating element is a shaft rotating with a rotor having a circumferential face facing said seal face.

23. The gas turbine engine as set forth in claim 22, wherein a grooved area is formed in one of said faces, with said grooved area having a plurality of circumferentially spaced grooves for generating hydrodynamic lift-off forces and allowing leakage of pressurized air across said seal face and into the bearing compartment to resist leakage of lubricant from the bearing compartment.

24. The gas turbine engine as set forth in claim 20, wherein said seal is a controlled gap carbon seal having a full hoop seal and a metal band shrunk fit onto the seal, and positioned in a seal carrier.

25. The gas turbine engine as set forth in claim 14, wherein the rotating element is driven by the fan drive turbine.

26. The gas turbine engine as set forth in claim 14, wherein said seal is a carbon seal.

* * * * *